United States Patent [19]

Martin

[11] Patent Number: 4,668,175
[45] Date of Patent: May 26, 1987

[54] APPARATUS FOR FORMING DEEP CONTAINERS

[75] Inventor: Raymond H. Martin, Midland, Mich.

[73] Assignee: Cosden Technology, Inc., Dallas, Tex.

[21] Appl. No.: 737,125

[22] Filed: May 23, 1985

[51] Int. Cl.$^4$ ............................................ B29C 51/10
[52] U.S. Cl. .................................. 425/388; 264/549;
 264/550; 425/326.1; 425/398
[58] Field of Search ............... 425/112, 122, 326.1,
 425/388, 504, 399, 398; 264/547, 549, 550, 551,
 292, 544

[56] References Cited

U.S. PATENT DOCUMENTS

| | | | |
|---|---|---|---|
| 2,749,572 | 6/1956 | Nowak | 425/388 |
| 2,985,914 | 5/1961 | Miller | 425/388 |
| 3,291,874 | 12/1966 | Negoro | 425/388 |
| 3,338,997 | 8/1967 | Tigner | 264/550 |
| 3,357,053 | 12/1967 | Lyon et al. | 264/550 |
| 3,497,916 | 3/1970 | Reifenhäuser | 425/388 |
| 3,728,098 | 4/1973 | Giffen | 425/388 |
| 4,253,579 | 11/1980 | Kurz et al. | 264/550 |
| 4,383,815 | 5/1983 | Kiefer et al. | 425/388 |
| 4,443,401 | 4/1984 | Turner | 264/550 |
| 4,552,717 | 11/1985 | Murley et al. | 264/550 |

FOREIGN PATENT DOCUMENTS

| | | | |
|---|---|---|---|
| 613809 | 1/1961 | Canada | 425/388 |
| 83/01412 | 4/1983 | PCT Int'l Appl. | |

Primary Examiner—Jay H. Woo
Assistant Examiner—James C. Housel
Attorney, Agent, or Firm—Roy L. Van Winkle; M. Norwood Cheairs

[57] ABSTRACT

Apparatus for forming deep containers from a thermoplastic material including a first mold portion having a cavity therein defining the side and bottom configuration of the container and a second mold portion having a plunger provided for reciprocation therein and arranged so that the plunger moves into the cavity. The first mold portion is provided with a first passageway that terminates adjacent to the cavity and in the parting surface of the mold portion and a second passageway that extends therethrough into the cavity adjacent to the bottom of the container. A control apparatus is provided that directs a vacuum through the first passageway securely holding the thermoplastic against the parting surface of the first mold portion. Vacuum is then exerted into the cavity through the second passageway along with the deformation of the plastic by extension of the plug into the cavity so that the plastic conforms to the configuration defined by the cavity while maintaining a substantially uniform wall thickness free from surface blemishes caused by undue stretching or folding of the plastic sheet as it is deformed into the cavity.

8 Claims, 7 Drawing Figures

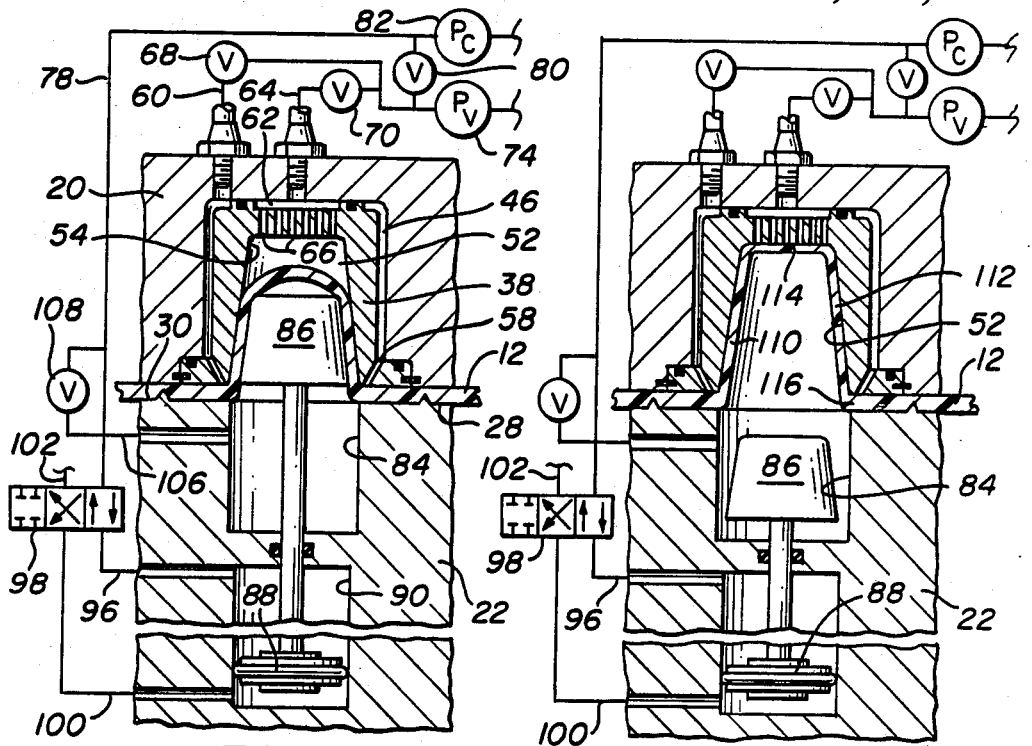
FIG. 3
FIG. 4
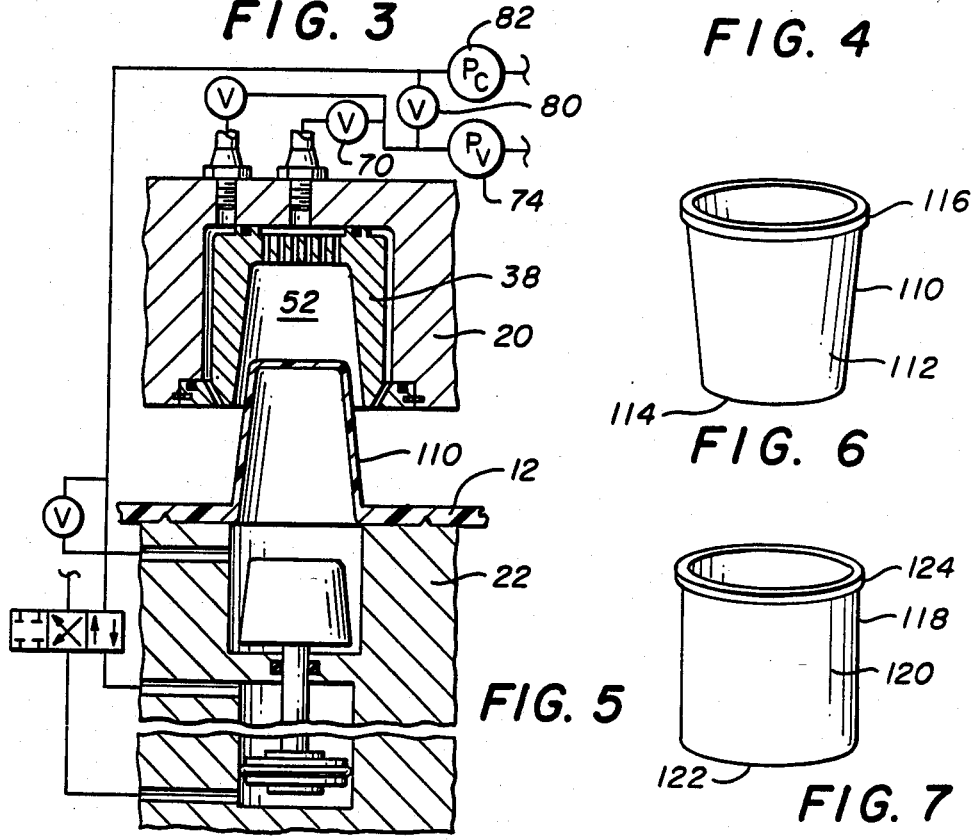
FIG. 5
FIG. 6
FIG. 7

0
APPARATUS FOR FORMING DEEP CONTAINERS

BACKGROUND OF THE INVENTION

This invention relates generally to apparatus for forming deep containers from a thermoplastic sheet. More particularly, but not by way of limitation, this invention relates to apparatus for forming deep containers from thermoplastic sheets that includes the use of vacuum as well as mechanical force for deforming the sheet into the cavity to form the deep container while maintaining a substantially constant wall thickness.

Somewhat similar apparatus for forming thermoplastic containers is illustrated in U.S. Pat. No. 4,443,401 issued Apr. 17, 1984 to Howard M. Turner and in an application published under the Patent Corporation Treaty on April 28, 1983 as International Publication No. WO 83/01412.

As mentioned, each of the foregoing discloses apparatus for forming containers from thermoplastic material. Each also uses a plunger to aid in deforming the plastic material and utilizes vacuum to assist in the forming operation. It is not known whether or not apparatus has actually been constructed in accordance with either of the foregoing disclosures, but if they were, such apparatus should operate with reasonable success. However, due to the clamping arrangement, the arrangement of the passageways in the mold portions, and the way in which positive pressure and vacuum is utilized, neither of the disclosures nor any combination thereof teaches the invention as set forth in this application.

One of the difficulties encountered in forming deep containers from thermoplastic material has been the difficulty of maintaining the wall thickness of the container substantially constant. When such wall thickness varies, either weak spots are formed in the container or surface marring occurs due to over-stretching portions of the container walls. Various attempts have been made to alleviate this problem, but none to applicant's knowledge has been entirely successful.

Accordingly, it is an object of this invention to provide apparatus that will form deep containers from a thermoplastic sheet while maintaining a substantially uniform wall thickness.

SUMMARY OF THE INVENTION

This invention then provides improved apparatus for forming deep containers from a thermoplastic sheet comprising a first mold portion having cavity forming means therein providing a mold cavity defining a bottom and wall exterior configuration of the container and intersecting a parting surface on the mold portion. The first mold portion includes a first passageway extending through the parting surface adjacent to the cavity and includes a second passageway extending therethrough into the cavity adjacent to the container bottom. A second mold portion has a parting surface for engaging the thermoplastic sheet to clamp the sheet between the parting surfaces. The second mold portion carries a plug that is moveable into and out of the cavity for engaging and deforming the sheet into the cavity. Vacuum means connected with the first and second passageways applies a vacuum therein and control means is arranged so that the vacuum is applied to said first passageway and then to said second passageway causing the sheet to conform to the configuration of the cavity and to maintain a substantially uniform wall thickness in the container.

The foregoing and additional objects and advantages of the invention will become more apparent as the following detailed description is read in conjunction with the accompanying drawing wherein like referenced characters denote like parts in all views and wherein:

BRIEF DESCRIPTION OF THE DRAWING

FIG. 3 is a cross-sectional view similar to FIG. 2, but illustrating the mold portions in another operating position.

FIG. 4 is a cross-sectional view similar to FIG. 2, but illustrating the mold portions in still another operating position.

FIG. 5 is another cross-sectional view of the mold portions similar to FIG. 2, but illustrating still an additional operating position thereof.

FIG. 6 is a pictorial illustration of a deep container having a tapered wall that may be formed in apparatus constructed in accordance with the invention.

FIG. 7 is a pictorial illustration of another deep container that has a straight wall that may also be formed in apparatus constructed by apparatus of the invention.

DETAILED DESCRIPTION OF THE PREFERRED EMBODIMENT

Figure 1:
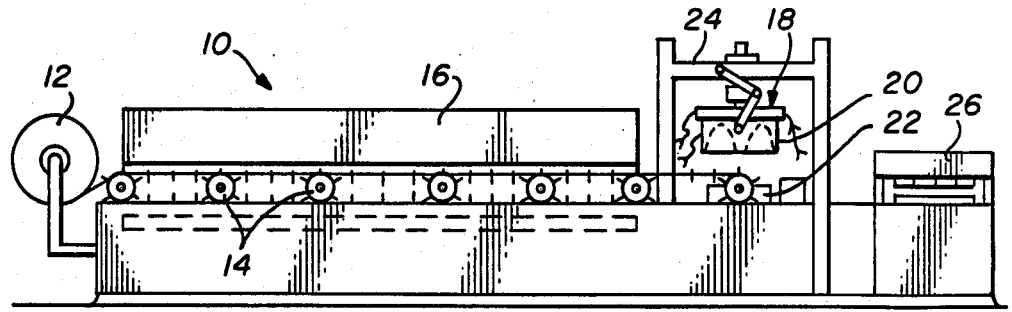
FIG. 1 is a somewhat schematic, elevation view of apparatus for forming deep containers from thermoplastic sheet.

Referring to the drawing and to FIG. 1 in particular, shown therein and generally designated by the reference character 10 is apparatus for producing containers from thermoplastic sheet. As shown therein, thermoplastic sheet 12 is moved by a conveyor 14 through a heater 16 that elevates the temperature of the thermoplastic sheet 12 to the desired forming temperature. Near the opposite end of the conveyor 14 is a mold assembly designated by the reference character 18 that consists of upper and lower mold portions 20 and 22.

As shown therein, the upper mold portion 20 is moveable toward and away from the lower mold portion 22 and is supported on and carried by a structure 24. After leaving the mold assembly 18, the thermoplastic sheet passes through a trimmer 26 that cuts the molded containers from the sheet 12.

Figure 2:
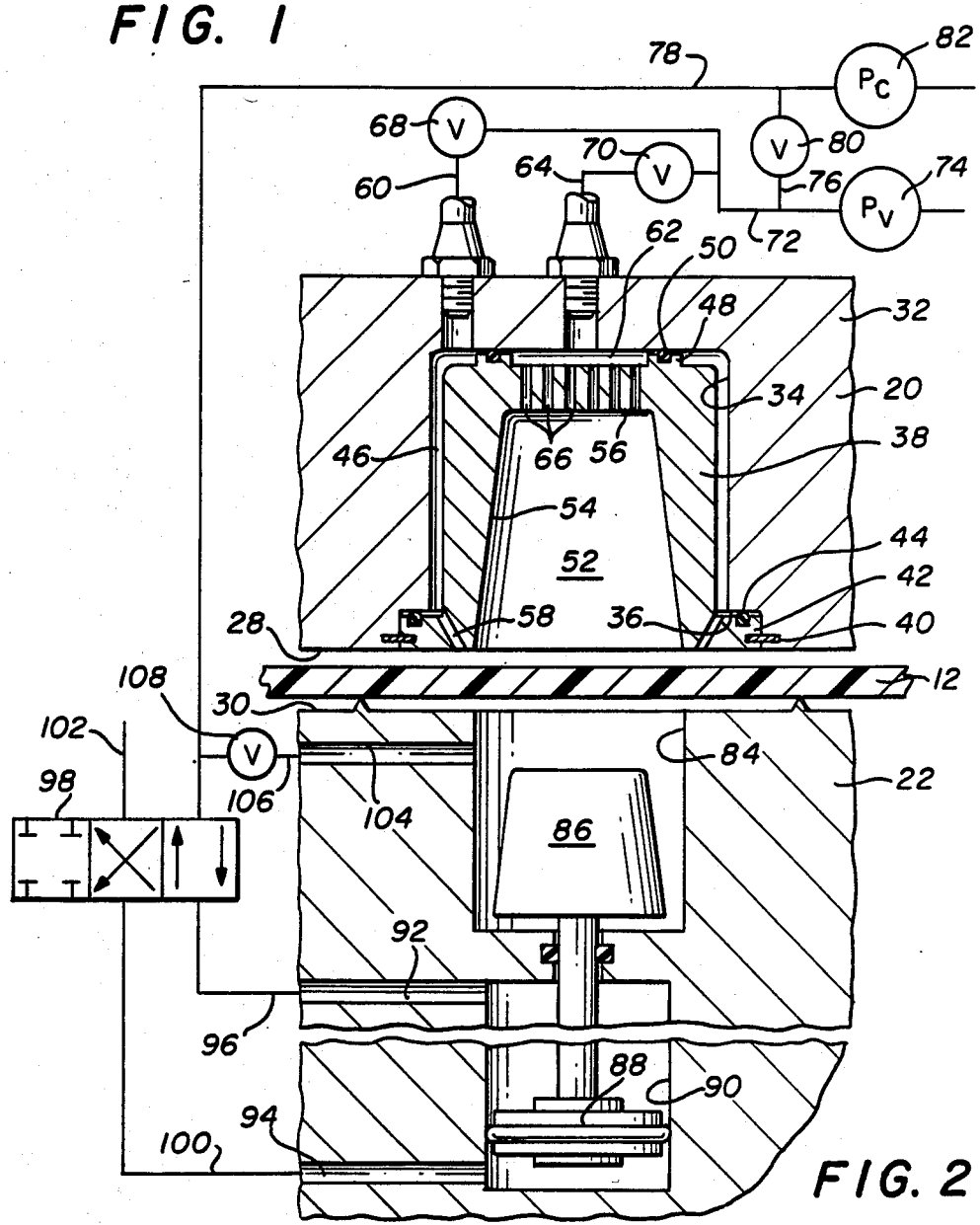
FIG. 2 is an enlarged fragmentary cross-sectional view of upper and lower mold portions that are constructed in accordance with the invention and useful in the apparatus shown in FIG. 1.

The enlarged fragmentary, cross-sectional view of FIG. 2 shows the upper mold portion 20 and the lower mold portion 22 in substantially more detail. The thermoplastic sheet 12 is illustrated as being disposed between a parting surface 28 on the upper mold portion 20 and a parting surface 30 located on the lower mold portion 22.

The upper mold portion includes a mold member 32 having a counterbore 34 located therein which bore 34 intersects the parting surface 28 forming a downwardly facing shoulder on surface 36 therein. An inner mold member 38 is positioned in the cavity 34 and retained therein by a suitable fastener such as a lockring 40.

It will be noted that the lockring 40 is removeably positioned in the mold member 32 in engagement with an annular flange 42 on the inner mold member 38. Removing the lockring 40 permits removal and replacement of the mold member 38. The flange 42 carries an annular seal 44 that is in sealing engagement with both the inner mold member 42 and surface 36 on the mold member 32.

The exterior diameter of the inner mold member 38 is slightly smaller than the bore 34 forming a chamber 46 between the inner mold member 38 and the mold member 32. At its upper end, the inner mold member 38 is provided with an annular raised portion 48 that carries an annular seal 50. The seal 50 is in sealing engagement with the inner mold member 38 and with the mold member 32.

The mold member 38 has a hollow interior 52 that is configured to provide a surface 54 which will define the sidewall of the container and a surface 56 which will define the bottom of the container (see FIGS. 5, 6 & 7).

A plurality of circumferentially spaced ports 58 extend through the flange 42 on the inner mold member 38 intersecting the parting surface 28 of the upper mold portion 20. It will be noted that the ports 58 are in communication with the chamber 46 which is also in communication with a conduit 60. The ports 58 and chamber 46 form a passageway through the upper mold portion 20 so that a vacuum can be exerted on the sheet 12.

The previously mentioned annular seal 50 divides the chamber 46 to provide a second chamber 62 that is in communication with a conduit 64 also for purposes that will be described hereinafter. The chamber 62 is in communication with the interior 52 of the inner mold member 38 through a plurality of ports 66 that extend therethrough. The ports 66 and chamber 62 form another passageway through the upper mold portion 32 so that a vacuum or pressure can be exerted in the interior 52.

The conduits 60 and 64 are each provided with a control valve 68 and 70 respectivel.y. Upstream from the valves 68 and 70 the conduits 60 and 64 are connected to a common conduit 72 that is connected to a vacuum pump 74. A branch conduit 76 is connected with the conduit 72 and bridges over to a conduit 78. The branch conduit 76 is provided with a control valve 80 so that the conduit 72 can be connected with the output of a pressure pump 82 when desired.

The lower mold portion 22 includes a bore 84 and has a plunger 86 located therein that is arranged for reciprocation. As illustrated, the plunger 86 is connected to a piston 88 disposed within a cylinder 90 that is also located within the lower mold portion 22. A first passageway 92 in the mold portion 22 extends into connection with the cylinder 90 and a second passageway 94 is also connected to the cylinder 90, but at the opposite end of the cylinder from the first passageway 92.

The passageway 92 is connected by conduit 96 with a control valve 98. The passageway 94 is connected by a conduit 100 with the control valve 98. The control valve 98 is connected to the conduit 78 and is provided with an exhaust 102.

A third passageway 104 extends through the lower mold portion 22 into connection with the bore 84. The passageway 104 is connected by conduit 106 with the conduit 78. Interposed in the conduit 106 is a control valve 108 that controls the flow of pressurized gas from the pump 82 into the bore 84.

OPERATION OF THE PREFERRED EMBODIMENT

FIGS. 2-5 illustrate the method utilized to mold a tapered container 110 as illustrated in FIG. 6. It can be seen therein that the container 110 includes a tapered sidewall 112, a bottom 114, and a radially projecting annular flange 116 encircling the upper open end of the container.

In FIG. 2, the sheet 12 has been raised in temperature to the proper molding temperature by the heaters 16. The upper mold portion 20 is being moved downwardly toward the lower mold portion 22 to clamp the sheet 12 therebetween. It will be noted that in this position, the plunger 86 is in a retracted position and does not extend out of the bore 84 in the lower mold portion 22.

In FIG. 3, the upper and lower mold portions 20 and 22 have been moved together securely clamping the sheet 12 therebetween. It will also be noted in that figure that the bore 84 is in substantially axial alignment with the interior 52 of the inner mold member 38.

After the sheet 12 has been securely clamped between the mold portions 20 and 22, the vacuum pump 74 is started. The valve 70 is closed and the valve 68 opened so that air or gas in the chamber 46 is evacuated through the conduit 60. Accordingly, a vacuum or sub-atmospheric pressure is exerted on the sheet 12 through the ports 58 holding the sheet 12 securely against the parting surface 28 of the upper mold portion 20 immediately adjacent to the intersection between the sidewall 54 of the inner mold member 38 and the parting surface 28.

The valve 70 is then opened evacuating air or gas from the interior 52 of the inner mold member 38 through the ports 66 and the chamber 62 so that the vacuum is exerted on the sheet 12, deforming the sheet 12 into the interior 52 of the inner mold member 38. To aid the deformation of the sheet 12 into the interior 52, the valve 98 is moved to a position wherein pressure is applied by the pump 82 through the conduit 78, valve 98 and conduit 100 into the cylinder 90. This pressure causes the piston 88 to drive the attached plunger 86 upwardly into the interior 52. Such upward movement, exerts a mechanical deforming force on the sheet 12.

If desired, and simultaneous with the exertion of the vacuum in the interior 52 and with the displacement of the plunger 86 into the interior 52, the valve 108 may be opened so that positive pressure is exerted through the conduit 106 into the bore 84. This pressure exerts a further deforming force tending to displace the sheet 12 into the interior 52 of the inner mold member 38. Thus, the combination of differential pressure across sheet 12, the retention of the sheet 12 at the periphery of the interior 52, and the mechanical displacement of the sheet 12 into the interior 52 all combine to exert a force on the sheet 12 so that the resulting container 110 (see FIG. 4) has a wall 112 of uniform cross-section. Thin spots in the wall 112 and surface mars on the container 110 are eliminated that may be caused by the exertion of uneven deformation forces.

FIG. 4 illustrates the cross-section of the container 110 in the interior 52 with the plunger 86 returned to the bore 84. Return of the plunger 86 into the bore 84 is accomplished by resetting the valve 98 to a position wherein pressure is exerted through the conduit 96 on the topside of the piston 88 and pressure is released through the conduit 100 and through exhaust 102 on the lower side of the piston 88.

In FIG. 5, the upper mold portion 20 has been raised almost clear of the container 110. It will be necessary to raise the upper portion 20 somewhat higher to remove the sheet 12 with the formed container 110 thereon from the mold. The sheet is then moved into the trimmer 26. It should be pointed out that in FIG. 5, the valve 80 has been opened with the vacuum pump 74 turned off so that positive pressure is exerted by the pump 82 through the open valve 70 into the interior 52 of the inner mold member 38. This pressure is exerted simultaneously with the parting of the mold portions 20 and 22 so that the container 110 and the sheet 12 are stripped from the upper mold portion 20.

FIG. 7 shows another embodiment of container 118 that can be constructed using a modified inner mold member. The container 118 is illustrated as having an essentially straight sidewall 120, a bottom 122 and again, a radially projecting annular flange 124 on the upper end thereof. While the containers 110 and 118 can be produced without the flanges 116 and 124 if desired, a small flange is required in some instances to retain a cap or cover utilized to close and seal the open upper ends of the containers.

From the foregoing, it will be appreciated that the apparatus described in detail hereinbefore is useful in producing very deep containers having thin walls while maintaining a uniformly constant thickness of such wall sections. It is believed that the differential pressure exerted thereacross, the boost afforded by the mechanical deformation, and the locking of the sheet at the periphery of the cavity all contribute to producing such wall uniformity.

Having described but a single embodiment of the invention, it should be apparent that many modifications and changes can be made thereto without departing from the spirit of the invention or scope of the annexed claims.

What is claimed is:

1. Apparatus for forming deep containers from a thermoplastic sheet comprising in combination:
   a first mold portion having cavity forming means therein providing a mold cavity defining the bottom and wall exterior configuration of the container, said cavity intersecting a first planar parting surface on said first mold portion, said first mold portion including a first passageway extending through said parting surface closely adjacent to said cavity and a second passageway extending therethrough into said cavity adjacent to the ccntainer bottom;
   a second mold portion having a second planar parting surface coextensive with said first planar parting surface and said first passageway for engaging said thermoplastic sheet to clamp said sheet between said parting surfaces, said second mold portion carrying a plug that is movable into and out of said cavity for engaging and deforming said sheet into said cavity;
   vacuum means connected with said first and second passageways for applying a vacuum therein; and,
   control means for applying said vacuum to said first passageway and then afterward to said second passageway, whereby said sheet conforms to the configuration of said cavity and has a substantially uniform wall thickness.

2. The apparatus of claim 1 wherein said control means also includes means for applying pressurized air in said second mold portion to aid said plug and vacuum in deforming said sheet into said cavity.

3. The apparatus of claim 1 and also including means for holding said mold portions and for moving said portions relatively together and apart.

4. The apparatus of claim 1 wherein said second mold portion includes a bore in which said plug is disposed, said bore intersecting said parting surface in alignment with said cavity and being substantially coincident with said cavity.

5. The apparatus of claim 1 wherein said cavity forming means includes a removable mold member located in said first mold portion.

6. The apparatus of claim 5 wherein said mold member and first mold portion define a vacuum chamber therein forming a portion of said second passageway.

7. The apparatus of claim 6 wherein said apparatus includes:
   a port in said mold member intersecting said bottom of said mold member forming part of said first passageway; and,
   a seal disposed between said mold member and first mold portion preventing communication between said first and second passageways.

8. The apparatus of claim 7 wherein said apparatus also includes:
   an annular seal encircling said mold member sealingly engaging said first mold portion proximate said parting surface; and,
   a plurality of ports in said mold member bypassing said annular seal and forming part of said second passageway.

* * * * *